April 5, 1949.  J. M. BRADY  2,465,999

WIND VANE OPERATED CONTROL SYSTEM

Filed March 5, 1946

INVENTOR.
JAMES M. BRADY

BY William D. Hall
Attorney

Patented Apr. 5, 1949

2,465,999

UNITED STATES PATENT OFFICE 2,465,999

WIND VANE OPERATED CONTROL SYSTEM

James M. Brady, Washington, D. C.

Application March 5, 1946, Serial No. 652,208

1 Claim. (Cl. 73—188)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to wind vane operated control systems, and one of the objects of the invention is to provide a system which automatically controls the movements of bodies which are too heavy or too large to be conveniently actuated by the vane.

The invention may, for example, be valuably employed to automatically steer a ship into the wind, this being desirable for ships carrying planes which are to take off from, or land on, the deck of the ship. The ship may be headed or reversed into the wind, depending on which approach to the landing deck is desired. The invention may also be used to turn wind generators into the wind, to receive the maximum driving power from the wind as it shifts.

Further, the invention has utility in controlling wind direction indicating means, either proximate to or remote from a wind vane. An instance of such indicating means are landing T's used on airfields to direct planes as to the proper landing runway. Wind operated landing T's on airfields have heretofore been unresponsive to winds of less than about 8 miles per hour, due to the direct connection between the vane and the T and to the comparative massiveness of the T. Under conditions of calm or low winds, therefore, neither the vane nor the T gave true indication of wind direction intended for the information of plane pilots and tower control operators, it being evident that the vane and the T under such wind conditions would remain in the position last assumed under the influence of winds capable of turning the T. This unsatisfactory operation led to the abandonment of landing T's, at many fields, in favor of the use of instructions from the tower control operator to the pilot, via radio, as to the most suitable landing strip to be used. Where landing T's have been retained, it is necessary that an attendant manually adjust the T's to true positions under the circumstances mentioned. On many airfields, except the very large ones, there is usually one favored, because longest, runway. Under conditions of calm or low winds, therefore, landing is made on that runway, and the position of the landing T should indicate it, regardless of any previous position assumed under higher winds.

It is, therefore, desirable that the T be made to assume such indicating position under calm or low wind conditions, and my present invention provides means whereby this is automatically accomplished.

The wind vane which is preferably employed as one of the elements of the system of the invention, is a more sensitive vane than those heretofore known, and is suspension mounted for that purpose, a torsionally flexible suspension being preferably employed, in the form of a thin strip or filament, as affording the least friction. In combination with this preferred type, or other type, of vane, the system comprises a heavy or comparatively heavy body, such as a ship, or indicating means such as a landing T, as examples, and power driven means responsive to movements of the vane for turning the object to be moved. With reference to an airfield runway, the vane is preferably disposed with its axis of rotation so inclined toward the runway, and is so weighted, that it will indicate, under conditions of calm and low winds, the position of the runway, any previous position of the vane under the influence of higher winds notwithstanding, and for reasons stated above.

The drawings illustrate one embodiment of the invention, and in these:

Figure 1:
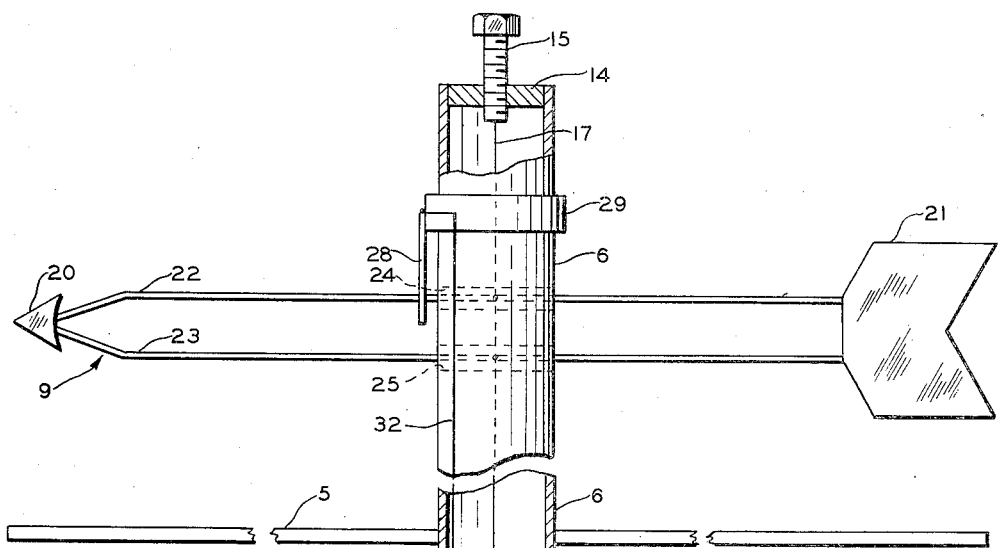
Figure 1 is a view showing the components of the system, the view being partly in elevation, and partly in section, while the electrical elements are shown diagrammatically in part.
Figure 2:
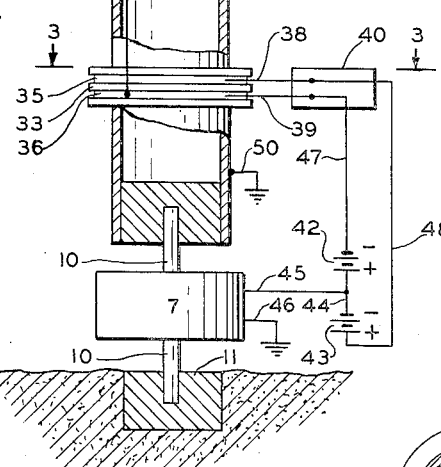
Figure 2 is a fragmentary view of Fig. 1, taken at right angles thereto and from the left.
Figure 2:
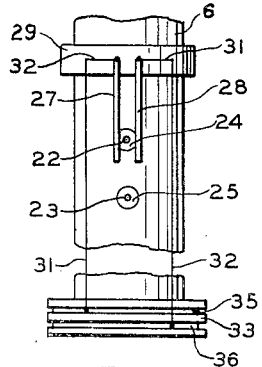
Figure 4:
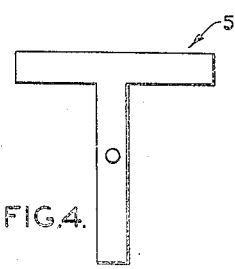
Figure 4 is a plan view of the landing T shown in Fig. 1.
Figure 3:
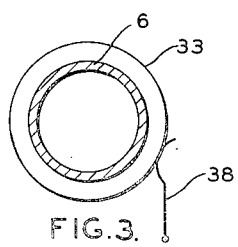
Figure 3 is a section taken in line 3—3 of Fig. 1.

Referring to the drawings for a more detailed description thereof, the numeral 5 indicates a rotatable landing T, secured to a hollow column 6 which is turned by a motor 7 in response to movements of a wind vane 9 which is aligned with the T. The apparatus is intended to be set up on an airfield, to indicate to the pilot of a plane the proper runway from which to take off or on which to land, the vane being the indicator for the first condition and the T for the second.

The motor 7 is set with its shaft 10 vertical, the lower part of the shaft 10 having a thrust bearing in a block 11 set in the ground, while the upper part of the shaft is fitted into the solid lower end portion of the column 6 and keyed thereto.

The vane 9 is suspension mounted in the column 6 to secure a vane of great sensitivity. To provide such mounting, the upper end of the column is fitted with a plug 14, which is centrally apertured and threaded to receive a screw 15, the lower end of the latter extending below the plug. A metallic filament 17 is secured to the lower end of the screw and extends downwardly along the axis of the column to another plug, 18, which fits into the column and is secured thereto, the lower end of the filament being secured thereto.

The arrow 9 comprises a head 20, a tail or feather 21, and a shaft joining the head and tail and consisting of horizontal upper and lower wires 22 and 23 which are welded to the mentioned filament, and which respectively pass thru pairs of apertures 24 and 25. The latter are of larger diameter than the wires, to allow these to be adjusted vertically by means of the screw 15 and to allow them freedom of horizontal motion. The upper wire 22 moves between a pair of resilient electrical contacts 27 and 28, which are secured at their upper ends to an insulating ring 29, the latter surrounding and being secured to the column 6. These electrical contacts, and the limits of the mentioned apertures, serve the useful purpose of limiting the sensitive vane to a small arc in rapidly shifting winds which cause the vane to oscillate, a more accurate indication being thereby given under such conditions. Wires 31 and 32 are affixed to the contacts 27 and 28 respectively and extend into the column and then downwardly inside the same to points opposite another insulating ring 33 which is secured exteriorly to the mentioned column. The wires 31 and 32 are brought out to make permanent contact with spaced metallic circular bands 35 and 36 respectively which are set exteriorly into the insulating ring 33. The mentioned circular bands 35 and 36 make contact with spring contacts 38 and 39 respectively, the latter riding on the bands as the column 6 turns or rotates. The spring contacts 38 and 39 are fixed at their outer ends to a support 40.

A pair of batteries, 42 and 43, disposed with polarities as shown, are connected by a conductor 44. One of the terminals of the motor 10 is connected to conductor 44 by a wire 45, the other terminal of the motor being grounded thru a wire 46. The outer terminals of the batteries 42 and 43 are connected to the spring contacts 39 and 38 by wires 47 and 48 respectively. The column 6 is grounded by a wire 50.

The operation of the apparatus is as follows. The turning of the vane in one direction brings the upper wire 22 of the arrow's shaft into contact, after a slight angular movement, with the depending electrical contact 27, and with the contact 28 when it turns in the opposite direction, also thru a small angle. The angle of turning before making contact may be regulated by determining the spacing between the contacts. When the vane moves to contact 27, a circuit is closed between battery 43 and motor 7 to start the latter, this circuit leading from the positive terminal of battery 43, thru wire 48, spring contact 38, band 35, wire 31, contact 27, wire 22, filament 17, screw 15, plug 14, column 6, the ground wire 46, armature of the motor 10, and conductors 45 and 44 to the negative terminal of the battery 43. When the vane moves to contact 28, a circuit is closed between battery 42 and motor 7, this circuit being readily traced.

It will be noted, from the disposition of the battery polarities, that the motor will turn in one direction when the vane closes one of the mentioned circuits, and in the opposite direction when it closes the other circuit, it being understood that the mentioned type of motor has permanent magnet poles and not electromagnetic poles, so that the reversal of current is thru the armature only. The motor being connected to turn the landing T 5, the latter will be turned in response to movements of the vane, and, being in alignment therewith, will indicate the wind direction and therefore the runway on which the plane is to land.

It will be seen from the foregoing disclosure that for small and comparatively rapid angular oscillations of the vane, which sometimes occur, the average direction is indicated, what may be termed integration of the fluctuations being thereby effected, the speed of the motor being adjusted to control the period of integration by controlling the angle thru which the vane is allowed to oscillate.

If it is desired to have the apparatus designate a favored runway, for use during calm or low winds, as explained above, the axis of rotation of the vane is inclined in the direction of the favored runway and toward the stopping point, and preferably the arrow is so weighted, that under the conditions mentioned, the arrowhead will indicate the direction toward which landing is to be made.

It will be readily appreciated that a plurality of landing T's, disposed at various positions or runways, may be operated by the use of only one vane, by using known means, such for example as Selsyn-servo systems. Ample power thus being available to overcome practical commutating friction lamps outlining the T's may be lighted for night indication, sets of variously colored lamps being placed on each T, as for example, red, yellow and green, and provision made for lighting these in accordance with the angular deviation of the T from alignment or parallelism with the runway, the set of green lights indicating that the T is in the direction of the runway and therefore that it is safe to land thereon.

What is claimed is:

The combination of a transversely apertured, electrically conducting hollow column, a conducting wind vane passing freely and transversely through the apertures of said column, a torsionally flexible conducting element suspended within the column, the vane being suspended from said conducting element, a landing indicator mounted on said column and aligned with said vane, an electric circuit including a source of electric power, and including also an electric motor adapted to turn said column when said circuit is closed, said circuit further including said column, conducting element and vane, and means whereby either clockwise or counterclockwise movement of said vane will close said circuit.

JAMES M. BRADY.

REFERENCES CITED

The following references are of record in the file of this patent:

UNITED STATES PATENTS

| Number | Name | Date |
| --- | --- | --- |
| 1,213,714 | Washburne et al. | Jan. 23, 1917 |
| 1,281,042 | MacMichael | Oct. 8, 1918 |
| 2,045,521 | Hertelendy | June 23, 1936 |
| 2,045,994 | Plaisted | June 30, 1936 |
| 2,055,370 | Wilhelm | Sept. 22, 1936 |
| 2,390,384 | Poole | Dec. 4, 1945 |

FOREIGN PATENTS

| Number | Country | Date |
| --- | --- | --- |
| 368,487 | Great Britain | Mar. 10, 1932 |